UNITED STATES PATENT OFFICE.

EDWARD G. WRIGHT, OF KANSAS CITY, MISSOURI.

COMPOSITION OF MATTER FOR CABLE-FILLING.

SPECIFICATION forming part of Letters Patent No. 446,502, dated February 17, 1891.

Application filed July 29, 1890. Serial No. 360,325. (No specimens.)

*To all whom it may concern:*

Be it known that I, EDWARD G. WRIGHT, a citizen of the United States, residing at Kansas City, in the county of Jackson and State of Missouri, have invented certain new and useful Improvements in Composition of Matter for Cable-Filling; and I do hereby declare the following to be a full, clear, and exact description of the invention, such as will enable others skilled in the art to which it appertains to make and use the same.

The object of my invention is to provide a material for filling, covering, and protecting wire in cables, which shall act as a non-destructible filling for the same, giving the entire cable an appearance of compact unity, preventing destruction from rust and the action of the elements, preventing by smoothness of wire the cutting of the strands, and even when cut by accident, wear, or otherwise separated, preventing their unraveling.

My composition consists of the following ingredients combined in the proportions stated, viz: crude petroleum, one pound seven and three-fourths ounces; tallow, one pound ten ounces; gypsum, eight ounces; whiting, three ounces; pine-tar, two pounds; paraffine-wax, one pound. These ingredients are to be melted by steam heat and then thoroughly mixed by agitation.

In using the above-named composition the cable should be thoroughly coated with the same by hand-brush or otherwise.

By using the above composition the cable is thoroughly protected from any wire cutting or destructive friction, as the composition furnishes a safeguard and has a tendency to hold the wire compactly together.

What I claim, and desire to secure by Letters Patent of the United States, is—

The herein-described composition of matter to be used for coating or filling wire cables, consisting of crude petroleum, tallow, gypsum, whiting, pine-tar, and paraffine-wax, in the proportions specified.

In testimony whereof I have affixed my signature in presence of two witnesses.

EDWARD G. WRIGHT.

Witnesses:
   DAISY B. SMALLEY,
   BESSIE E. YOUNG.